US008676538B2

(12) United States Patent
Purdy

(10) Patent No.: US 8,676,538 B2
(45) Date of Patent: Mar. 18, 2014

(54) ADJUSTING WEIGHTING OF A PARAMETER RELATING TO FAULT DETECTION BASED ON A DETECTED FAULT

(75) Inventor: Matthew A. Purdy, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 1564 days.

(21) Appl. No.: 10/979,309

(22) Filed: Nov. 2, 2004

(65) Prior Publication Data

US 2006/0095232 A1    May 4, 2006

(51) Int. Cl.
| | | |
|---|---|---|
| G06F 11/30 | (2006.01) | |
| G06F 17/40 | (2006.01) | |
| G06F 19/00 | (2011.01) | |
| B23Q 17/00 | (2006.01) | |

(52) U.S. Cl.
USPC ............... 702/183; 73/865.9; 438/5; 438/14; 700/96; 700/110; 700/121; 702/182; 702/185; 702/187; 702/189

(58) Field of Classification Search
USPC ........... 702/185, 1, 33, 34, 35, 36, 40, 57, 58, 702/59, 81, 82, 83, 84, 108, 113, 114, 115, 702/117, 118, 127, 179, 181, 182, 183, 187, 702/189; 73/865.8, 865.9; 438/5, 6, 7, 8, 9, 438/10, 11, 12, 13, 14, 15, 16, 17, 18; 700/1, 11, 21, 79, 90, 95, 96, 108, 109, 700/110, 117, 118, 119, 120, 121, 159, 174, 700/175; 708/100, 105, 200; 714/1, 25, 37, 714/48, 100

IPC ..................... B23B 49/00; B23Q 15/00,15/007, B23Q 15/12, 17/00, 17/904, 17/952, 17/10, B23Q 17/12, 17/20; G05B 13/00; G06F 11/00, G06F 11/30, 11/3058, 11/32, 17/00, 17/40, G06F 19/00

See application file for complete search history.

(56) References Cited

U.S. PATENT DOCUMENTS

| | | | | |
|---|---|---|---|---|
| 2,883,255 | A | * | 4/1959 | Anderson ........................ 346/34 |
| 2,897,638 | A | * | 8/1959 | Maker ................................ 451/5 |
| 3,461,547 | A | * | 8/1969 | Di Curcio .......................... 438/7 |

(Continued)

FOREIGN PATENT DOCUMENTS

| | | |
|---|---|---|
| WO | WO 03/058699 A1 | 7/2003 |
| WO | WO 2004/003822 A1 | 1/2004 |
| WO | WO 2004/105101 A2 | 12/2004 |

OTHER PUBLICATIONS

Cinar, A. et al. "Statistical Process and Controller Performance Monitoring. A Tutorial on current methods and future directions" American Control Conference, vol. 4, Jun. 2, 1999; pp. 2625-2639, XP010344696.

(Continued)

*Primary Examiner* — Edward Cosimano

(57) ABSTRACT

A method, apparatus and a system, for provided for performing a dynamic weighting technique for performing fault detection. The method comprises processing a workpiece and performing a fault detection analysis relating to the processing of the workpiece. The method further comprises determining a relationship of a parameter relating to the fault detection analysis to a detected fault and adjusting a weighting associated with the parameter based upon the relationship of the parameter to the detected fault.

31 Claims, 8 Drawing Sheets

(56) References Cited

U.S. PATENT DOCUMENTS

| | | | |
|---|---|---|---|
| 5,070,468 A * | 12/1991 | Niinomi et al. | 702/185 |
| 5,287,284 A * | 2/1994 | Sugino et al. | 700/97 |
| 5,658,423 A * | 8/1997 | Angell et al. | 438/9 |
| 5,711,849 A | 1/1998 | Flamm et al. | 156/643.1 |
| 5,786,023 A | 7/1998 | Maxwell et al. | 427/8 |
| 5,825,482 A | 10/1998 | Nikoonahad et al. | 356/237 |
| 6,119,074 A * | 9/2000 | Sarangapani | 702/185 |
| 6,232,134 B1 | 5/2001 | Farber et al. | 438/9 |
| 6,238,937 B1 * | 5/2001 | Toprac et al. | 438/9 |
| 6,368,883 B1 * | 4/2002 | Bode et al. | 438/14 |
| 6,405,096 B1 * | 6/2002 | Toprac et al. | 700/121 |
| 6,442,496 B1 | 8/2002 | Pasadyn et al. | 702/83 |
| 6,521,080 B2 * | 2/2003 | Balasubramhanya et al. | 156/345.24 |
| 6,549,864 B1 * | 4/2003 | Potyrailo | 702/81 |
| 6,564,114 B1 * | 5/2003 | Toprac et al. | 700/121 |
| 6,582,618 B1 * | 6/2003 | Toprac et al. | 216/59 |
| 6,590,179 B2 * | 7/2003 | Tanaka et al. | 219/121.43 |
| 6,616,759 B2 * | 9/2003 | Tanaka et al. | 118/63 |
| 6,675,137 B1 * | 1/2004 | Toprac et al. | 703/2 |
| 6,678,569 B2 * | 1/2004 | Bunkofske et al. | 700/108 |
| 6,706,543 B2 * | 3/2004 | Tanaka et al. | 438/14 |
| 6,740,534 B1 | 5/2004 | Adams, III et al. | 438/14 |
| 6,789,052 B1 * | 9/2004 | Toprac | 703/2 |
| 6,834,213 B1 * | 12/2004 | Sonderman et al. | 700/121 |
| 6,853,920 B2 * | 2/2005 | Hsiung et al. | 702/1 |
| 6,859,739 B2 * | 2/2005 | Wegerich et al. | 702/32 |
| 6,865,509 B1 * | 3/2005 | Hsiung et al. | 702/182 |
| 6,871,114 B1 * | 3/2005 | Green et al. | 700/110 |
| 6,912,433 B1 * | 6/2005 | Chong et al. | 700/110 |
| 7,024,335 B1 * | 4/2006 | Parlos | 702/182 |
| 7,043,403 B1 * | 5/2006 | Wang et al. | 702/185 |
| 7,054,786 B2 * | 5/2006 | Sakano et al. | 702/183 |
| 7,089,072 B2 | 8/2006 | Chia | |
| 7,089,182 B2 | 8/2006 | Souilmi et al. | |
| 7,151,976 B2 * | 12/2006 | Lin | 700/108 |
| 7,212,952 B2 * | 5/2007 | Watanabe et al. | 702/183 |
| 7,328,126 B2 * | 2/2008 | Chamness | 702/182 |
| 2002/0062162 A1 * | 5/2002 | Bunkofske et al. | 700/108 |
| 2002/0072882 A1 * | 6/2002 | Kruger et al. | 703/2 |
| 2002/0107858 A1 * | 8/2002 | Lundahl et al. | 707/100 |
| 2003/0008507 A1 * | 1/2003 | Bell et al. | 438/689 |
| 2003/0055523 A1 * | 3/2003 | Bunkofske et al. | 700/108 |
| 2003/0065462 A1 * | 4/2003 | Potyrailo | 702/81 |
| 2003/0074603 A1 * | 4/2003 | Bungert et al. | 714/37 |
| 2003/0109951 A1 * | 6/2003 | Hsiung et al. | 700/108 |
| 2003/0136511 A1 * | 7/2003 | Balasubramhanya et al. | 156/345.25 |
| 2003/0144746 A1 * | 7/2003 | Hsiung et al. | 700/28 |
| 2004/0002776 A1 * | 1/2004 | Bickford | 700/30 |
| 2004/0040001 A1 * | 2/2004 | Miller et al. | 716/4 |
| 2004/0101983 A1 * | 5/2004 | Jones et al. | 438/14 |
| 2004/0259276 A1 * | 12/2004 | Yue et al. | 438/5 |
| 2005/0060103 A1 * | 3/2005 | Chamness | 702/30 |
| 2005/0071034 A1 * | 3/2005 | Mitrovic | 700/121 |
| 2005/0071035 A1 * | 3/2005 | Strang | 700/121 |
| 2005/0071036 A1 * | 3/2005 | Mitrovic | 700/121 |
| 2005/0071037 A1 * | 3/2005 | Strang | 700/121 |
| 2005/0071038 A1 * | 3/2005 | Strang | 700/121 |
| 2005/0071039 A1 * | 3/2005 | Mitrovic | 700/121 |
| 2005/0141782 A1 * | 6/2005 | Guralnik et al. | 382/276 |
| 2005/0146709 A1 | 7/2005 | Oh et al. | |
| 2005/0149297 A1 * | 7/2005 | Guralnik et al. | 702/189 |
| 2005/0159922 A1 * | 7/2005 | Hsiung et al. | 702/182 |
| 2005/0171627 A1 * | 8/2005 | Funk et al. | 700/121 |
| 2005/0187649 A1 * | 8/2005 | Funk et al. | 700/121 |
| 2005/0203696 A1 * | 9/2005 | Watanabe et al. | 701/114 |
| 2005/0216114 A1 * | 9/2005 | Hsiung et al. | 700/108 |
| 2005/0221514 A1 * | 10/2005 | Pasadyn et al. | 438/14 |
| 2005/0268197 A1 * | 12/2005 | Wold | 714/746 |
| 2006/0025879 A1 * | 2/2006 | Purdy | 700/101 |
| 2006/0074590 A1 * | 4/2006 | Bailey et al. | 702/182 |
| 2006/0111804 A1 * | 5/2006 | Lin | 700/110 |

OTHER PUBLICATIONS

Yue, H.H. et al.; "Weighted Principal Component Analysis and its Applications to Improve FDC Performance" Decision and Control, 2004. CDC. 43$^{rd}$ IEEE Conference on Nassau, Bahamas Dec. 14-17, 2004; vol. 4, pp. 4262-4267, XP010794793.

H. Yue and R. Lam; "Monitoring Etch Tool Health Using Weighted PCA"; AEC/APC Symposium XV, Sematech, Sep. 13-18, 2003; Colorado Springs, CO; XP009060799.

PCT International Search Report; Feb. 9, 2006.

* cited by examiner

PCA Matrix, X (m x n)

| | 1st Column<br>Pressure Data | 2nd Column<br>Humidity Data | 3rd Column<br>Temperature Data | 4th Column<br>Gas-flow rate Data | ... | mth Column<br>Process State Data |
|---|---|---|---|---|---|---|
| 1st Row<br>1st Wafer Data | Pressure(1) | Humidity(1) | Temperature (1) | Gas-flow rate (1) | ••• | Process Data (1) |
| 2nd Row<br>2nd Wafer Data | Pressure(2) | Humidity(2) | Temperature (2) | Gas-flow rate (2) | ••• | Process Data (2) |
| 3rd Row<br>3rd Wafer Data | Pressure(3) | Humidity(3) | Temperature (3) | Gas-flow rate (3) | ••• | Process Data (3) |
| ••• | ••• | ••• | ••• | ••• | ••• | ••• |
| nth Row<br>nth Wafer Data | Pressure(n) | Humidity(n) | Temperature (n) | Gas-flow rate (n) | ••• | Process Data (n) |

FIGURE 4

ADJUSTING WEIGHTING OF A PARAMETER RELATING TO FAULT DETECTION BASED ON A DETECTED FAULT

BACKGROUND OF THE INVENTION

1. Field of the Invention

This invention relates generally to semiconductor manufacturing, and, more particularly, to a method, system, and apparatus for performing a process to improve fault detection reliability through feedback.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using the patterned layer of photoresist as a mask. This etching process results in the formation of various features or objects in the process layer. Such features may be used as, for example, a gate electrode structure for transistors. Many times, trench isolation structures are also formed in various regions of the semiconductor wafer to create electrically isolated areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on approximately one to four die 103 locations at a time, depending on the specific photomask employed. The patterned photoresist layer can be used as a mask during etching processes, wet or dry, performed on the underlying layer or layers of material, e.g., a layer of polysilicon, metal, or insulating material, to transfer the desired pattern to the underlying layer. The patterned layer of photoresist is comprised of a plurality of features, e.g., line-type features or opening-type features that are to be replicated in an underlying process layer.

When processing semiconductor wafers, various measurements relating to the process results on the semiconductor wafers, as well as conditions of the processing tool in which the wafers are processed, are acquired and analyzed. The analysis is then used to modify subsequent processes. Turning now to FIG. 2, a flow chart depiction of a state-of-the-art process flow is illustrated. A processing system may process various semiconductor wafers 105 in a lot of wafers (block 210). Upon processing of the semiconductor wafers 105, the processing system may acquire metrology data relating to the processing of the semiconductor wafers 105 from selected wafers in the lot (block 220). Additionally, the processing system may acquire tool state sensor data from the processing tool used to process the wafers (block 230). Tool state sensor data may include various tool state parameters such as pressure data, humidity data, temperature data, and the like.

Based upon the metrology data and the tool state data, the processing system may perform fault detection to acquire data relating to faults associated with the processing of the semiconductor wafers 105 (block 240). Upon detecting various faults associated with processing of the semiconductor wafers 105, the processing system may perform a principal component analysis ("PCA") relating to the faults (block 250). Principal component analysis (PCA) is a multivariate technique that models the correlation structure in the data by reducing the dimensionality of the data. The correlation may take on various forms, such as correlation of problems with the processed wafers with problems in the processing tool. The PCA may provide an indication of the types of corrections that may be useful in processing subsequent semiconductor wafers 105. Upon performing the PCA, the processing system may perform subsequent processes upon the semiconductor wafers 105 with various adjustments being based upon the PCA (block 260). The PCA performs an analysis to determine whether there are abnormal conditions that may exist with respect to a tool. Upon detecting any abnormal conditions, various signals may be issued, indicating to the operators that various faults have been detected.

One issue associated with state-of-the-art methods includes the fact that a determination of what constitutes an abnormal correlation may be based upon data used to build a fault detection model or a PCA model used to perform the fault detection analysis and the PCA. Generally, the abnormal conditions detected by performing the PCA may be statistically different from the data that may have been used to build the fault detection or the PCA model. The term "statistically different" may mean a variety of statistical differences, such as differences based upon population mean, variance, etc. These abnormal conditions may not be an accurate reflection of the true manner of operation in which the tool is performing. For example, if during the development of the fault detection model or the PCA model, the values for a pressure sensor were held within small constraints, larger variations in the pressure during the actual processing would generally be identified as a significant fault. The problem with this methodology is that if the larger variation of the pressure did not result in any negative impact to the material being processed, then the fault indication may be false. In other words, if the larger variation was still small enough that no significant impact to the process was present, a false-positive fault indication occurs. This false-positive introduces inefficiencies and idle times in a manufacturing setting.

More recently, various efforts have been made to incorporate weighting schemes into PCA. The weighting schemes may provide a significant difference in weight attached to various parameters, such as the pressure. However, the problems associated with the state-of-the-art weighting schemes include the fact that prior knowledge is required to assign a predetermined weight to a particular parameter. For example, prior knowledge may indicate that a smaller amount of weight should be assigned to the pressure parameter during the PCA analysis relating to a particular process. This would reduce false indications due to variations in pressure that may have been harmless. However, this methodology can be an inefficient, cumbersome task and, at best, may involve guess work. Furthermore, it may not be readily clear if adjusting the weight to particular parameters would result in improved or worsened PCA relating to a particular process.

The present invention is directed to overcoming, or at least reducing, the effects of, one or more of the problems set forth above.

SUMMARY OF THE INVENTION

In one aspect of the present invention, various methods are disclosed for employing a dynamic weighting technique in connection with fault detection analysis. In an illustrative embodiment, the method comprises processing a workpiece and performing a fault detection analysis relating to the processing of the workpiece. The method further comprises determining a relationship of a parameter relating to the fault detection analysis to a detected fault and adjusting a weighting associated with the parameter based upon the relationship of the parameter to the detected fault.

In another aspect of the present invention, a method is provided for performing a dynamic weighting technique for performing fault detection. The method comprises processing a workpiece and performing a fault detection analysis relating to the processing of the workpiece based upon a tool state parameter being input into a fault detection model associated with the fault detection analysis. The method further comprises determining whether said parameter is associated with a detected fault as a result of performing the fault detection analysis and modifying a weighting of the parameter in the fault detection model based upon a determination that the parameter is associated with the detected fault.

In yet another aspect of the present invention, a method is provided for performing a dynamic weighting technique for performing fault detection. The method comprises processing a workpiece and performing a fault detection analysis relating to the processing of the workpiece based upon a tool state parameter being input into a fault detection model associated with the fault detection analysis. The method further comprises performing a principal component analysis (PCA) in conjunction with the fault detection analysis and determining whether the parameter is associated with a detected fault as a result of performing the fault detection analysis and the PCA. The method further comprises modifying a weighting of the parameter in the fault detection model based upon a determination that the parameter is associated with the detected fault.

In another aspect of the present invention, an apparatus is provided for performing a dynamic weighting technique for performing fault detection. The apparatus comprises a controller that performs a fault detection analysis relating to a processing of a workpiece to determine a relationship between a parameter relating to the fault detection analysis and a detected fault. The controller also adjusts a weighting associated with the parameter based upon the relationship of the parameter to the detected fault.

In another aspect of the present invention, a system is provided for performing a dynamic weighting technique for performing fault detection. The system comprises a processing tool communicatively coupled to a controller, a metrology tool, and a tool state data sensor unit. The processing tool performs a process upon a workpiece. The metrology tool acquires metrology data relating to the process performed on the workpiece to provide metrology data. The tool state data sensor unit acquires tool state data. The controller performs a fault detection analysis relating to the processing of the workpiece to determine a relationship between a parameter relating to the fault detection analysis and a detected fault. The controller also adjusts a weighting associated with the parameter based upon the relationship of the parameter to the detected fault.

In yet another aspect of the present invention, a computer readable program storage device encoded with instructions is provided for performing a dynamic weighting technique for performing fault detection. The instructions perform a method comprising a processing tool communicatively coupled to a controller, a metrology tool, and a tool state data sensor unit. The processing tool performs a process upon a workpiece. The metrology tool acquires metrology data relating to the process performed on the workpiece to provide metrology data. The tool state data sensor unit acquires tool state data. The controller performs a fault detection analysis relating to the processing of the workpiece to determine a relationship between a parameter relating to the fault detection analysis and a detected fault. The controller also adjusts a weighting associated with the parameter based upon the relationship of the parameter to the detected fault.

BRIEF DESCRIPTION OF THE DRAWINGS

The invention may be understood by reference to the following description taken in conjunction with the accompanying drawings, in which like reference numerals identify like elements, and in which:

FIG. 4 illustrates a principal component analysis matrix table, which depicts a list of tool state variables being correlated with data relating to various processed semiconductor wafers, in accordance with one illustrative embodiment of the present invention;

Figure 1:
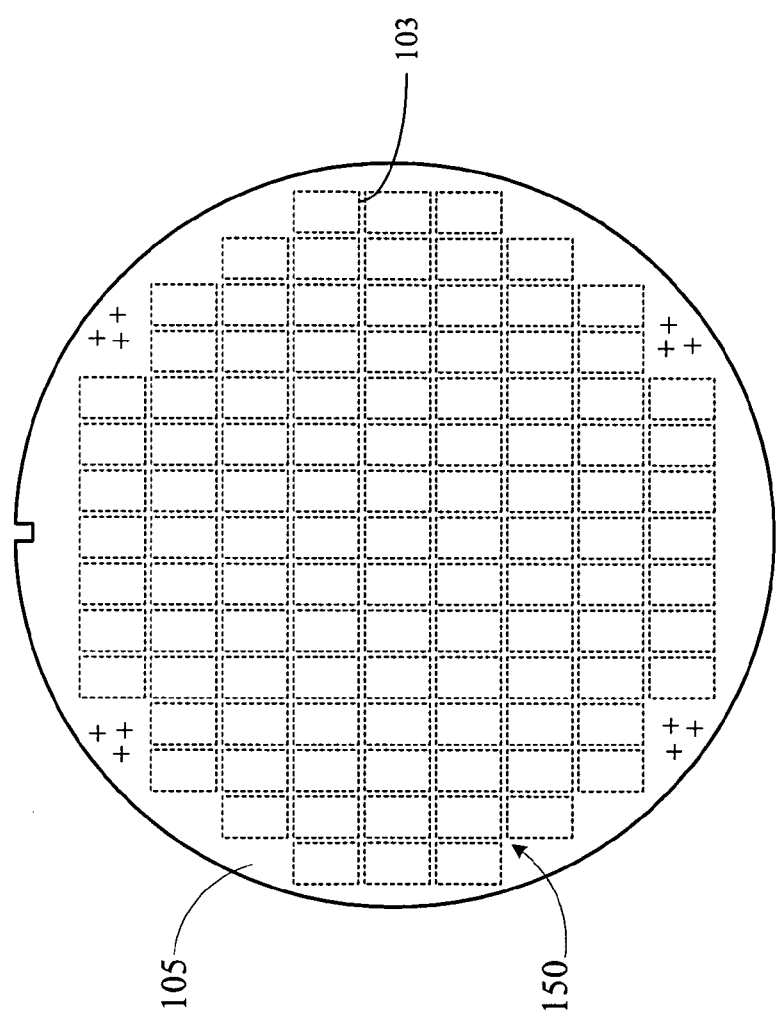
FIG. 1 is a simplified diagram of a prior art semiconductor wafer being processed.
Figure 2:
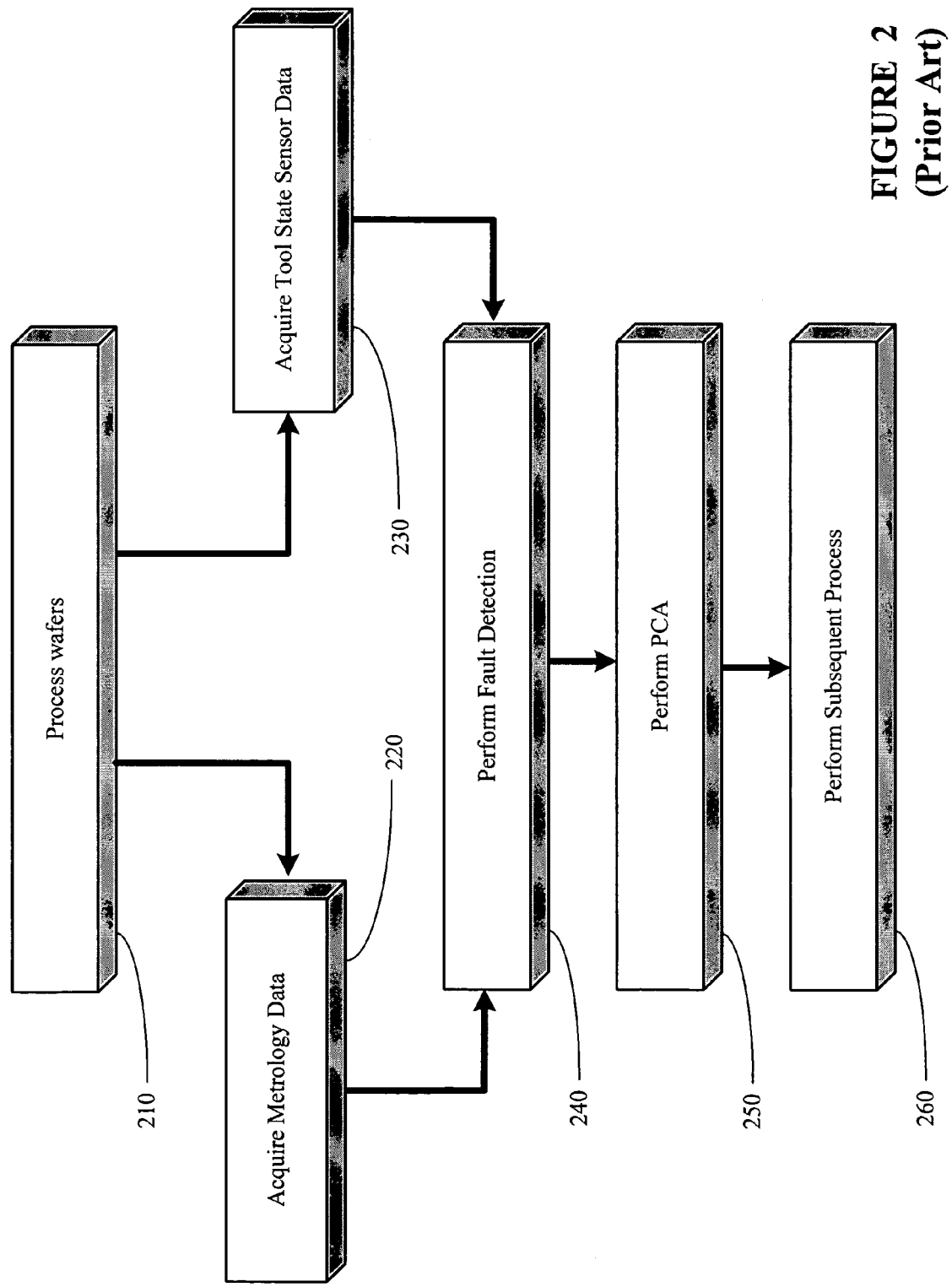
FIG. 2 illustrates a simplified flowchart depiction of a prior art process flow during manufacturing of semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for performing a dynamic adjustment of the weighting of one or more parameters associated with fault detection and/or performing a principal component analysis (PCA). The weighting of various parameters that may be used in a fault detection model and/or a PCA model may be automatically determined and the weighting of the parameters may be adjusted dynamically. For example, after a fault condition is identified by a processing system, an automatic input or a manual input may be provided to the processing system to indicate whether the detected fault was a significant fault or an insignificant fault. Based upon this indication, a weighting fault matrix, which contains data correlating various tool state parameters to particular wafers, may be modified to make the detection of similar faults more likely, or alternatively, less likely. Therefore, in multi-variate fault detection and/or PCA models, one or more parameters that contributed to the fault condition and their relative importance to the fault may be detected and a dynamic adjustment of the weighting of those parameters that contributed the fault may be increased proportionally. Likewise, one or more parameters that did not significantly contribute to the fault condition and their relative non-importance to the fault may be characterized and a dynamic adjustment of the weighting of those parameters may be decreased proportionally. In other words, the weighting of the parameters that were found not to have contributed to a fault may be decreased. Therefore, a stronger signal would be required relating to those parameters to generate a fault indication.

Embodiments of the present invention provide for the ability to perform dynamic weighting adjustments without requiring prior knowledge of which particular parameters to adjust before the fault detection and/or the PCA model is executed. Over time, weighting of the model parameters may be modified to increase the sensitivity of parameters that have been found to have contributed significantly to fault conditions, thereby causing the processing system to focus process corrections to those parameters. This may have the effect of reducing the number and/or the magnitude of faults caused by those parameters. Similarly, over time, the weighting of the model parameters may be modified to reduce the frequency of false positive fault indications, thereby reducing unnecessary downtime and inefficiencies during the manufacturing of semiconductor wafers 105.

Figure 3:
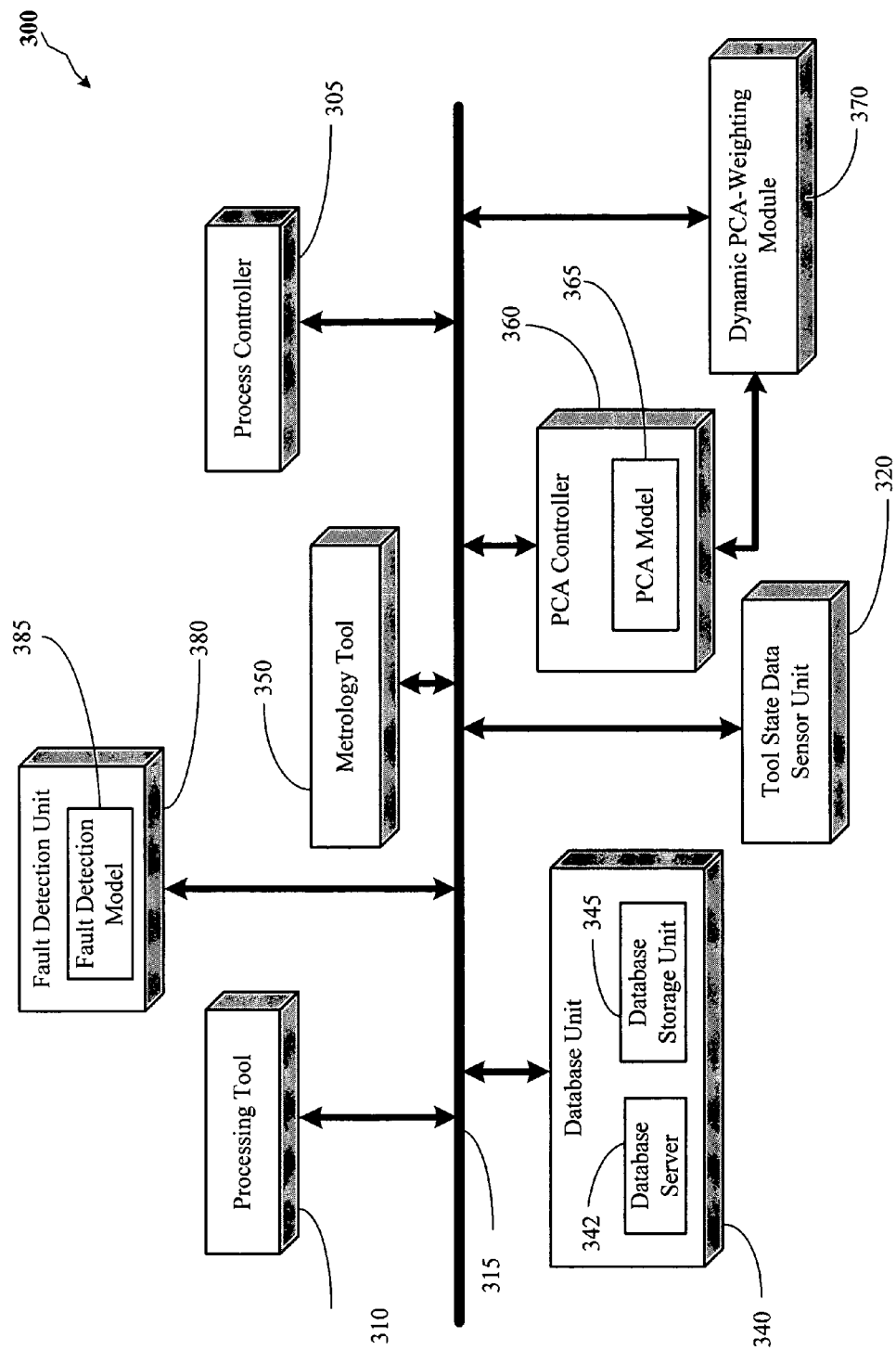
FIG. 3 provides a block diagram representation of a system in accordance with one illustrative embodiment of the present invention.

Turning now to FIG. 3, a block diagram depiction of a system 300 in accordance with illustrative embodiments of the present invention is illustrated. A process controller 305 in the system 300 is capable of controlling various operations relating to a processing tool 310. The process controller 305 may comprise a computer system that includes a processor, memory, and various computer-related peripherals. Moreover, although a single process controller 305 is schematically depicted in FIG. 3, in practice, the function performed by the process controller 305 may be performed by one or more computers or workstations spread throughout the manufacturing system.

Semiconductor wafers 105 are processed by the processing tool 310 using a plurality of control input signals, or manufacturing parameters, provided via a line or network 315. The control input signals, or manufacturing parameters, on the line 315 are sent to the processing tool 310 from a process controller 305 via machine interfaces that may be located inside or outside the processing tool 310. In one embodiment, semiconductor wafers 105 may be provided to the processing tool 310 manually. In an alternative embodiment, semiconductor wafers 105 may be provided to the processing tool 310 in an automatic fashion (e.g., robotic movement of semiconductor wafers 105). In one embodiment, a plurality of semiconductor wafers 105 is transported in lots (e.g., stacked in cassettes) to the processing tools 310. Examples of the processing tool used in semiconductor manufacturing processes may be photolithography tools, ion implant tools, steppers, etch process tools, deposition tools, chemical-mechanical polishing (CMP) tools, and the like.

The system 300 is capable of acquiring manufacturing related data, such as metrology data, related to processed semiconductor wafers 105, tool state data, and the like. The system 300 may also comprise a metrology tool 350 to acquire metrology data related to the processed semiconductor wafers 105. The system 300 may also comprise a tool state data sensor unit 320 for acquiring tool state data. The tool state data may include pressure data, temperature data, humidity data, gas flow data, various electrical data, a level of out-gas data, and other types of data, related to operations of the processing tool 310. Exemplary tool state data for an etch tool may include gas flow, chamber pressure, chamber temperature, voltage, reflected power, backside helium pressure, RF tuning parameters, etc. The tool state data may also include data external to the processing tool 310, such as ambient temperature, humidity, pressure, etc. A more detailed illustration and description of the tool state data sensor unit 320 is provided in FIG. 5 and accompanying description below.

The system 300 may also comprise a database unit 340. The database unit 340 is provided for storing a plurality of types of data, such as manufacturing-related data, data related to the operation of the system 300 (e.g., the status of the processing tool 310, the status of semiconductor wafers 105, etc.). The database unit 340 may store parameter data relating to parameters used in fault detection and PCA models, as well as tool state data relating to a plurality of process runs performed by the processing tool 310. The database unit 340 may comprise a database server 342 for storing tool state data and/or other manufacturing data related to processing semiconductor wafers 105, into a database storage unit 345.

The system 300 also comprises a fault detection unit 380, which is capable of performing various fault detection associated with the processing tool 310 when processing the semiconductor wafers 105. The fault detection unit 380 may comprise a fault detection model 385 that is capable of performing a modeling function when performing the fault detection. Various parameters may be inputted into the fault detection model 385. For example, various predetermined ranges for pressure, temperature, humidity, and/or gas flow, may be provided to the model such that the model may assert a fault detection condition based upon the fault data received by the fault detection unit 380. The fault detection model 385 may be a multi-variate model that performs fault modeling based upon various parameters. In one embodiment, the fault detection unit 380 is capable of correlating metrology data results with tool state sensor data to characterize a fault.

The system 300 may also comprise a PCA controller 360, which operates in conjunction with the fault detection unit 380 to perform a principal component analysis in determining any abnormal conditions or faults relating to the processing of semiconductor wafers 105. The PCA controller 360 may comprise a PCA model 365 that is capable of performing a modeling function when performing the PCA. Various parameters and manufacturing data may be inputted into the PCA model 365. For example, various predetermined ranges for pressure, temperature, humidity, and/or gas flow, may be provided into the model such that the model may assert a fault condition based upon the PCA. Manufacturing data is defined to comprise various types of data including metrology data, fault data, sensor data, and the like. A more detailed description relating to the weighted PCA analysis in accordance with an illustrative embodiment of the present invention is provided below.

The system 300 may also comprise a dynamic PCA weighting module 370, which is capable of receiving data automatically and/or manually relating to information indicating whether a particular parameter that was considered abnormal is indeed a significant factor in any detected faults. The dynamic PCA weighting module 370 is capable of adjusting the weighting of various parameters that are analyzed by the PCA controller 360. The weighting may also affect the parameter ranges inputted into the fault detection model 385 and/or the PCA model 365. A more detailed description of the dynamic PCA Weighting module 370 is provided in FIG. 5 and accompanying description below.

Various elements of the system 300, such as the process controller 305, the fault detection unit 380, the PCA controller 360, and the dynamic PCA Weighting module 370 may be software, hardware, or firmware unit(s) that are standalone units or may be integrated into a computer system associated with the system 300. Furthermore, the various components represented by the blocks illustrated in FIG. 3 may communicate with one another via a system communications line 315. The system communications line 315 may be one or more computer bus links, one or more dedicated hardware communications links, one or more telephone system communications links, one or more wireless communications links, and/or other communication links that may be implemented by those skilled in the art having benefit of the present disclosure.

The Principal component analysis performed by the PCA controller 360 includes a multivariate technique that models the correlation structure in the data by reducing the dimensionality of the data. A data matrix, X, of n samples (rows) and m variables (columns) can be decomposed as follows:

$$X = \hat{X} + \tilde{X}. \tag{1}$$

where the columns of X are typically normalized to zero mean and unit variance. The matrices $\hat{X}$ and $\tilde{X}$ are the modeled and un-modeled residual components of the X matrix, respectively. The modeled and residual matrices can be written as:

$$\hat{X} = TP^T \text{ and } \tilde{X} = \tilde{T}\tilde{P}^T, \tag{2}$$

where $T \in R^{n \times 1}$ and $P \in R^{m \times 1}$ are the score and loading matrices, respectively, and 1 is the number of principal components retained in the model. It follows that $\tilde{T} \in R^{n \times (m-1)}$ and $\tilde{P} \in R^{m \times (m-1)}$ are the residual score and loading matrices, respectively.

The loading matrices, P and $\tilde{P}$, are determined from the eigenvectors of the correlation matrix, R, which can be approximated by:

$$R \approx \frac{1}{n-1} X^T X. \tag{3}$$

The first eigenvectors of R (corresponding to the largest eigenvalues) are the loadings, P, and the eigenvectors corresponding to the remaining m−1 eigenvalues are the residual loadings, $\tilde{P}$.

The number of principal components (PCs) retained in the model is an important factor in fault detection with PCA. If too few PCs are retained, the model will not capture all of the information in the data, and a poor representation of the process will result. On the other hand, if too many PCs are chosen, then the model will be over parameterized and will include noise. The variance of reconstruction error (VRE) criterion for selecting the appropriate number of PCs is based on omitting parameters and using the model to reconstruct the missing data. The number of PCs, which results in the best data reconstruction, is considered the optimal number of PCs to be used in the model. Other, well-established methods for selecting the number of PCs include the average eigenvalues method, cross validation, etc.

When performing PCA using weighted parameters, instead of having parameters in the columns of X being normalized to zero mean and unit variance, the parameters in the columns are divided by a number other than the variance of each column. In other words, parameters in the columns are divided by a number that is not the standard deviation. This provides a weighted parameter in the columns of X. For example, if pressure parameter is closely correlated to a fault, the column of X that defines the pressure may be divided by a value that is not the standard deviation, thereby increasing the sensitivity of the fault analysis with respect to the pressure parameter. On the other hand, if pressure parameter is determined to be a factor that is least likely of being associated with a fault, the column of X that defines the pressure may be divided by yet another value that is not the standard deviation, thereby decreasing the sensitivity of the fault analysis with respect to the pressure parameter.

One of the calculations that are performed when performing a PCA algorithm is scaling of the data that is fed into the PCA model 365. For example, as illustrated in FIG. 4, a matrix X described above may contain data in a first column relating to pressure data, a second column relating to humidity data, a third column relating to temperature data, a fourth column relating to gas flow rate data, an so on, up to an $m^{th}$ column relating to another parameter. Each row relating to the columns may indicate data relating to the condition of a semiconductor wafer 105 in a lot; in an alternative embodiment, the rows may define various lots of semiconductor wafers 105. The rows may comprise data relating to a first semiconductor wafer 105, a second semiconductor wafer 105, a third semiconductor wafer 105, through an $n^{th}$ semiconductor wafer 105.

The PCA model 365 may scale the parameters indicated in FIG. 4 to provide greater or lesser weight attached to any particular parameter in the column of the matrix, X. Different weights may be attached to different parameters based upon a particular type of process being performed by the processing tool 310. For example, the pressure parameter may be assigned a different weighting for PCA analysis for a deposition process as compared to the weighting assigned to the pressure parameter during a photolithograph process. However, during the photolithography process, the temperature data may be assigned a higher or lower weighting as compared to the deposition process. One method of scaling may include scaling each column to a non-unit variance. To accomplish this, instead of dividing by the variance of each column, a division by another number based on the particular weighting assigned to the parameter may be performed. For example, if temperature is considered a more important parameter, the temperature parameter in the temperature data column (i.e., the $3^{rd}$ column in the matrix, X) may be divided by a number different from the standard deviation for that column. In order to cause the fault detection algorithm to be more sensitive to variability to a given parameter, a column in the matrix X may be divided by a number that is smaller than the variance calculated from that particular column. In order to cause the fault detection algorithm to be less sensitive to variability to a given parameter, a column in the matrix X may be divided by a number that is larger than the variance calculated from that particular column. Throughout the rest of the PCA algorithms, small variations in the temperature may be more likely to be recognized as a fault as compared to the variation of a parameter that was not weighted in the same fashion. In one embodiment, the PCA controller 360 is capable of prompting the dynamic PCA weighting module 370 to adjust the weighting of the parameters in the columns of FIG. 4, in a manual and/or in a dynamic, automated fashion.

Figure 5:
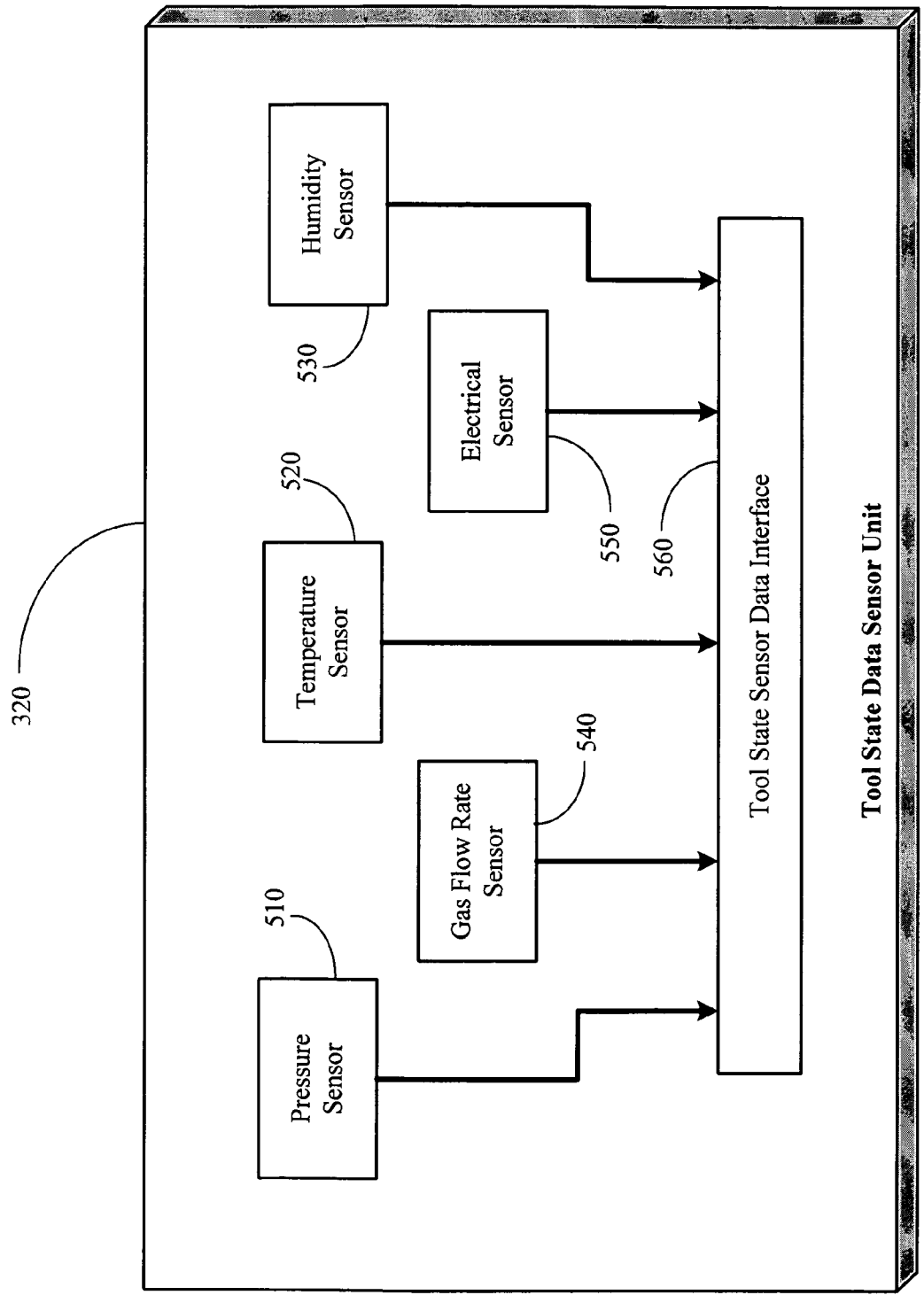
FIG. 5 illustrates a more detailed block diagram representation of a tool state data sensor unit of FIG. 3, in accordance with one illustrative embodiment of the present invention.

Turning now to FIG. 5, a more detailed block diagram depiction of the tool state data sensor unit 320 illustrated in FIG. 3 is provided. The tool state data sensor unit 320 may comprise any of a variety of different types of sensors, e.g., a pressure sensor 510, a temperature sensor 520, a humidity sensor 530, a gas flow rate sensor 540, and an electrical sensor 550, etc. In an alternative embodiment, the tool state data sensor unit 320 may comprise in situ sensors that are integrated into the processing tool 310. The pressure sensor 10 is capable of detecting the pressure within the processing tool 310. The temperature sensor 520 is capable of sensing the temperature in various locations of the processing tool 310. The humidity sensor 530 is capable of detecting the relative humidity at various portions in the processing tool 310, or of the surrounding ambient conditions. The gas flow rate sensor 540 may comprise a plurality of flow-rate sensors that are capable of detecting the flow-rate of a plurality of process gases utilized during processing of semiconductor wafers 105. For example, the gas flow rate sensor 540 may comprise sensors that can detect the flow rate of gases such as $NH_3$, $SiH_4$, $N_2$, $N_2O$, and/or other process gases.

In one embodiment, the electrical sensor 550 is capable of detecting a plurality of electrical parameters, such as the current provided to a lamp used in a photolithography process. The tool state data sensor unit 320 may also comprise other sensors capable of detecting a variety of manufacturing variables known to those skilled in the art having benefit of the present disclosure. The tool state data sensor unit 320 may also comprise a tool state sensor data interface 560. The tool state sensor data interface 560 may receive sensor data from the various sensors that are contained within, or associated with, the processing tool 310, and/or the tool state data sensor unit 320 and transmit the data to the process controller 305.

Figure 6:
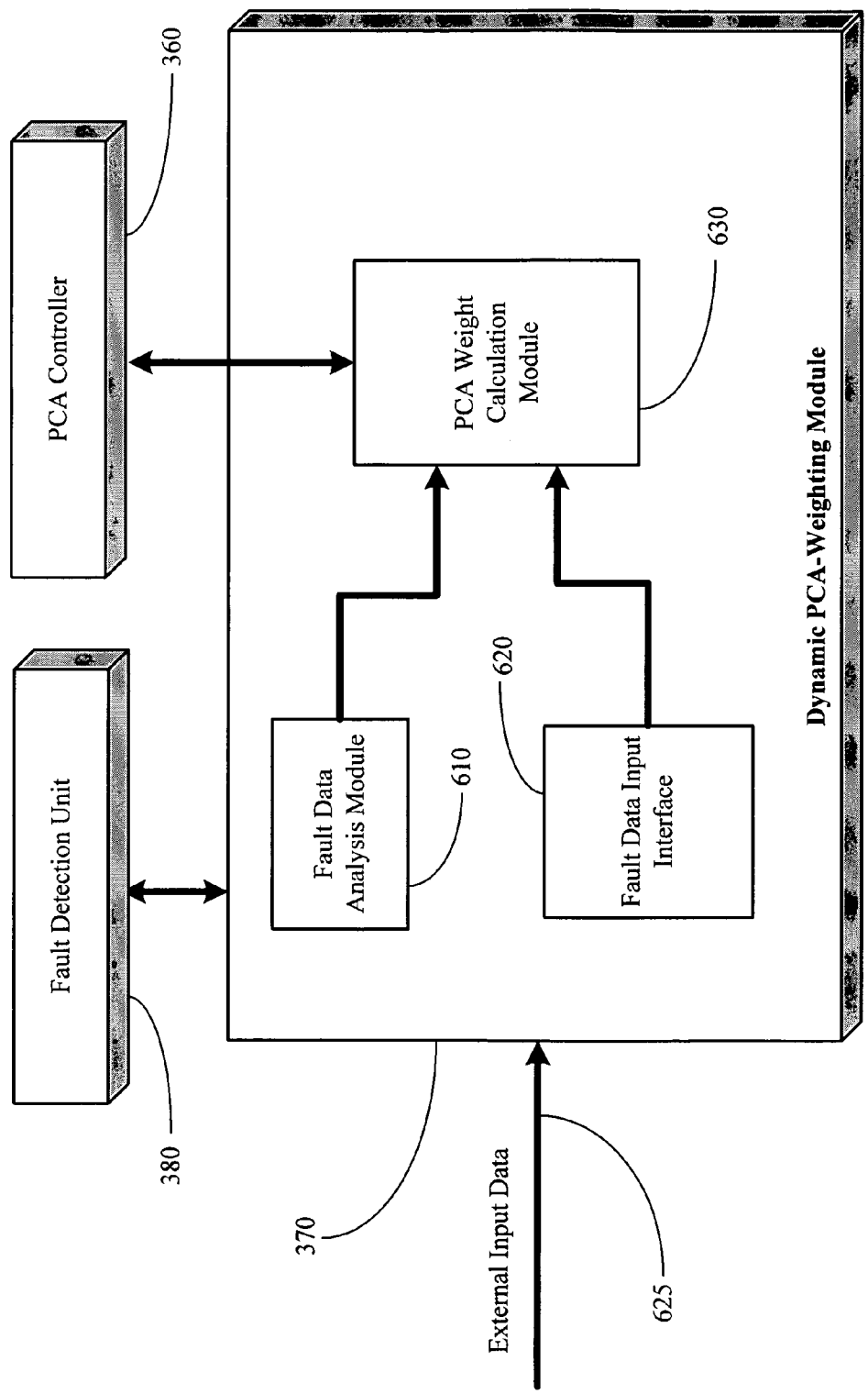
FIG. 6 illustrates a more detailed block diagram representation of a dynamic PCA weighting unit of FIG. 3, in accordance with one illustrative embodiment of the present invention.

Turning now to FIG. 6, a more detailed block diagram representation of the dynamic PCA weighting module 370 in accordance with an illustrative embodiment of the present invention is provided. As indicated in FIG. 6, the dynamic PCA weighting module 370 may comprise a fault data analysis module 610, a fault data input interface 620, and a PCA weight calculation module 630. Based upon the faults compared to various algorithms and fault data processed by the fault data analysis module 610, a determination is made as to whether a particular parameter that was considered abnormal by the fault detection unit 380 in conjunction with the PCA controller 360, is substantially associated with the fault or not. Based upon that determination, the PCA weight calculation module 630 may reduce or increase the weight associated with that particular parameter. This information may be sent to the PCA controller 360 and to the fault detection unit 380. Alternatively, an external data input on a line 625 may be provided to the dynamic PCA-weighting module 370 as a manual input to indicate whether a particular parameter that was flagged as abnormal, did indeed contributed considerably to a particular fault. The fault data input interface 620 is capable of receiving the external data input and is capable of providing the data to the PCA weight calculation module 630, which appropriately adjusts the weighting of the particular parameter.

Therefore, the dynamic PCA weighting module 370 may determine data and/or receive data that may be used to adjust the weight attached to a particular parameter. This information may be used by the fault detection unit 380 and/or the PCA controller 360 to perform analysis relating to any abnormality (and/or faults) during the processing of semiconductor wafers 105. In other words, after the fault condition is identified, the PCA weight calculation module 630 receives information from the fault data analysis module 610 and/or the fault data input interface 620 as to whether the fault was an actual fault and/or whether any parameters associated with the abnormality or the fault contributed significantly to that fault or abnormality. Based upon this data, the PCA weight calculation module 630 may decrease or increase the weighting of the parameter or, alternatively, leave the weighting of the parameter unchanged.

Figure 7:
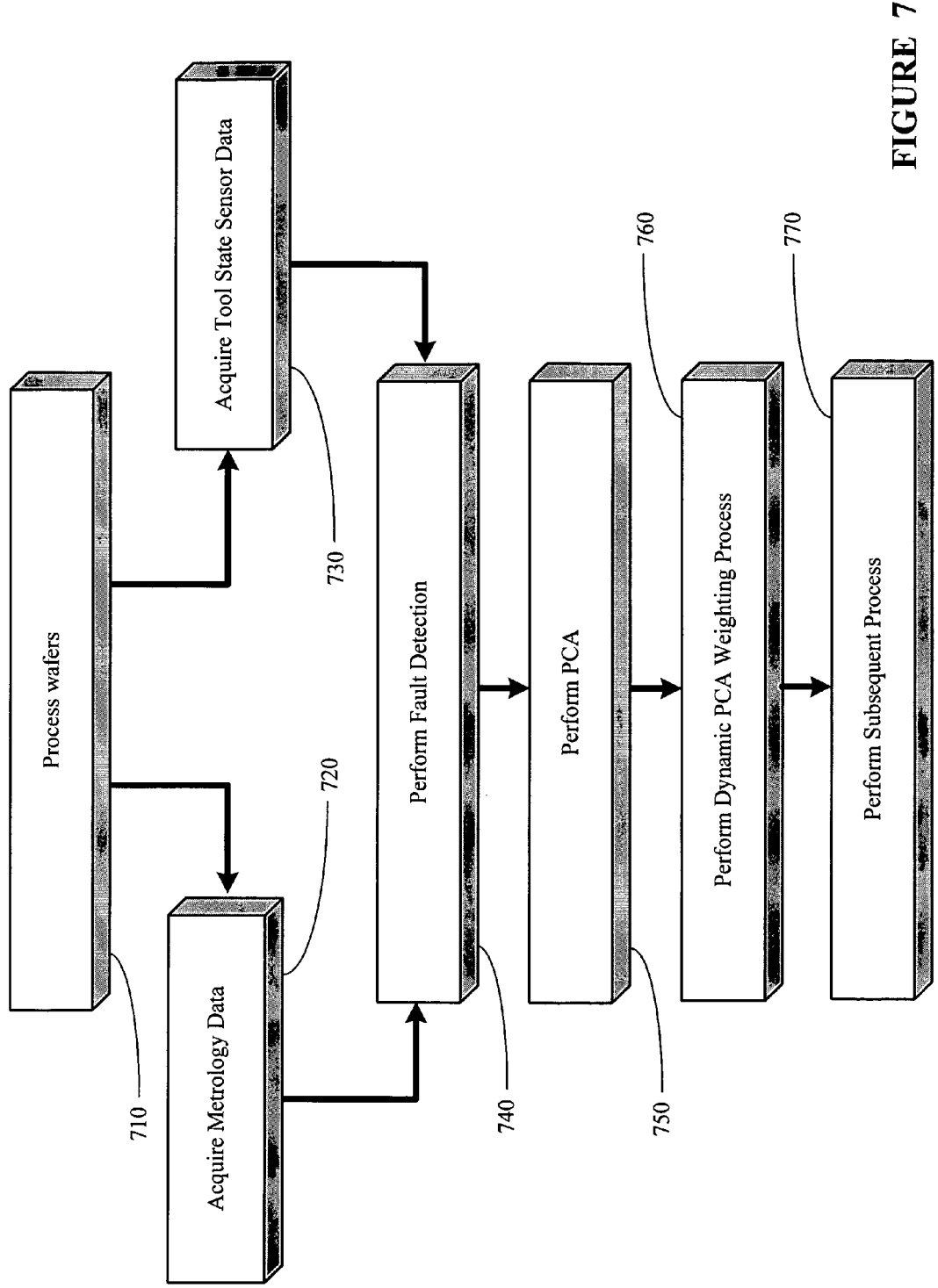
FIG. 7 illustrates a flowchart depiction of a method in accordance with one illustrative embodiment of the present invention.

Turning now to FIG. 7, a flow chart representation of the methods associated with embodiments of the present invention is illustrated. The system 300 may process one or more semiconductor wafers 105 (block 710). Based upon processing of the semiconductor wafers 105, the system 300 may acquire metrology data relating to the process performed on the semiconductor wafers 105 (block 720). Additionally, the system 300 may also acquire tool state sensor data relating to the process performed by the processing tool 310 (block 730). Based upon the metrology data and/or the tool state sensor data, the system 300 may perform fault detection relating to the processing of semiconductor wafers 105 (block 740). The system 300 may also execute a PCA algorithm in conjunction with the fault detection to detect any abnormalities or faults associated with the processing of semiconductor wafers 105 (block 750).

The system 300 may also perform a dynamic PCA-weighting process to adjust the weighting of any particular parameter(s) that may be used by the fault detection and the PCA models to analyze the operation of the processing tool 310 (block 760). A more detailed illustration and description of the dynamic PCA-weighting process is provided in FIG. 8 and accompanying description below. Based upon the dynamic PCA-weighting process, various adjustments to the weighting of particular parameters may be made to more accurately assess any faults associated with processing of semiconductor wafers 105. Upon dynamically adjusting the weighting of the PCA parameters, the system 300 may perform subsequent processes on the semiconductor wafers 105 based upon the newly adjusted parameter-weighting for more accurately assessing the faults or abnormalities associated with the processing of semiconductor wafers 105 (block 770).

Figure 8:
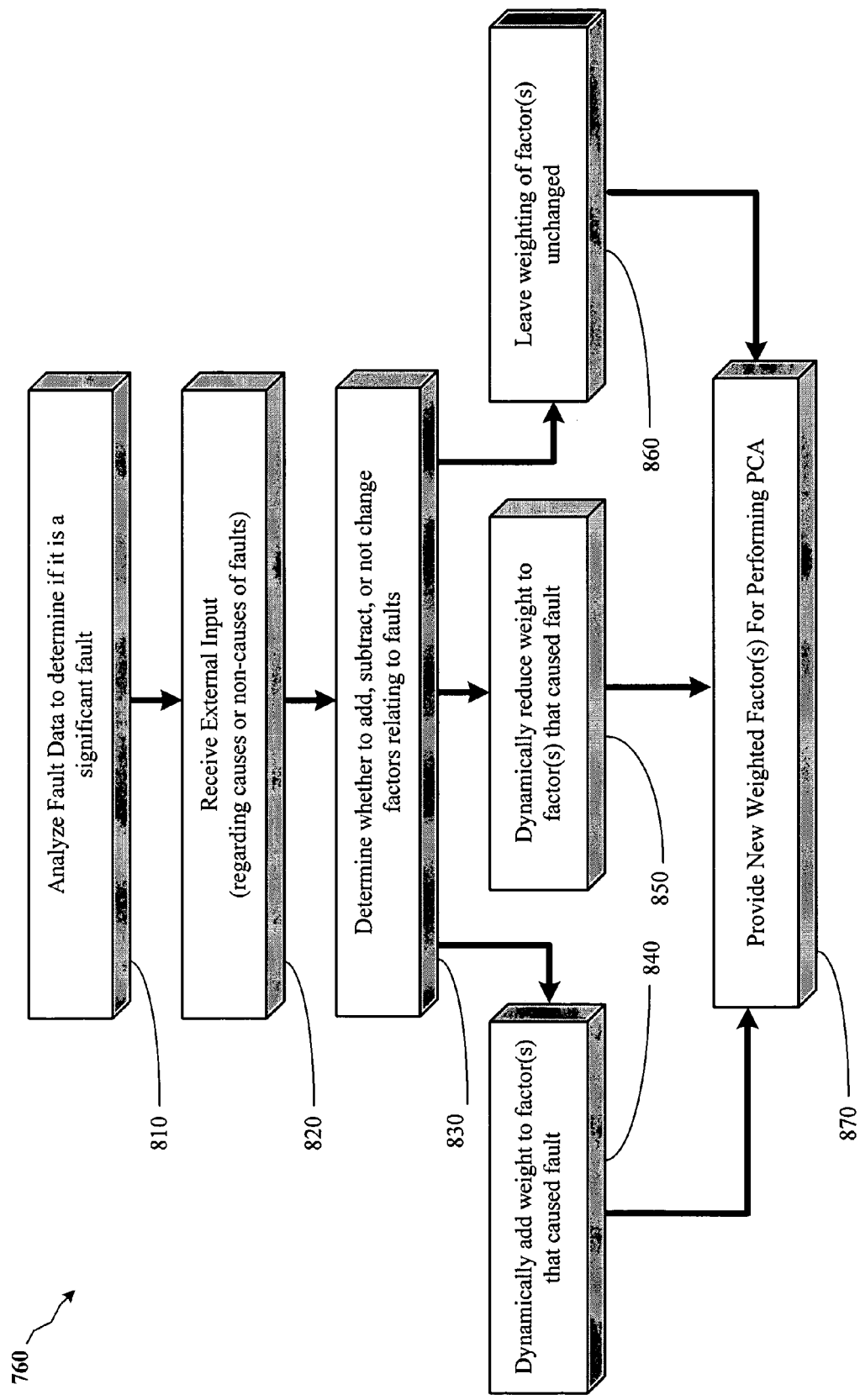
FIG. 8 illustrates a more detailed flowchart depiction of a method of performing a dynamic PCA weighting process, as indicated in FIG. 7, in accordance with one illustrative embodiment of the present invention.

Turning now to FIG. 8, a more detailed flow chart illustration of the dynamic PCA-weighting process is provided. The system 300 analyzes the fault data resulting from the fault data analysis and/or the PCA, in order to determine whether any particular parameters associated with any faults or abnormalities detected that are associated with the processing of semiconductor wafers 105 is actually a significant fault (block 810). In other words, the system 300 determines whether the abnormality or fault indication relates to an actual fault. The system 300 also analyzes the fault data to determine whether any parameter that was flagged did indeed provide a significant contribution to the fault or abnormality. In one embodiment, the significant contribution may relate to a determination of the importance of the parameter, as it relates to the fault indication. In another embodiment, the significant contribution may relate to a causation relation between the parameter and the fault indication.

An example relating to the significant contribution to a fault or abnormality is provided below. For example, a process model may have a pressure parameter (P), a temperature parameter (T), a RF power parameter (R), and a gas flow rate parameter (G). Initially, the weighting for each of these parameters (i.e., P, T, R, G) may equal to 1, e.g., a parameter matrix may provide that [P, T, R, G]=[1, 1, 1, 1]. After a wafer lot is processed, the fault/abnormality contribution plot signature may change to [P, T, R, G]=[0, 0.2, 3, −2.5]. If the system 300 or a user determines that the fault is an actual fault, the various contributions relating to each parameter may be examined. In the present example, the system 300 may determine that the parameter R and G contributed most to the fault or abnormality, since R and G had the highest magnitude. Accordingly, the system 300 may modify the parameter weighting according to an algorithm for those parameters that impacted or significantly contributed to the fault. Therefore, the system 300 may then provide a new parameter weighting value that may be represented by the matrix [P, T, R, G]=[1, 1, 1.1, 1.1]. The system 300 may then process another wafer lot, and a fault may be detected. A user or the system 300 may then determine that the fault is not an actual fault. Based upon this determination, the system 300 may examine the contribution plot and make a determination that the parameters P and R contributed significantly to the "false" fault. In response, the system 300 may modify the weighting according to an algorithm for those factors. For example, the new weighting factors may be represented by the matrix [P, T, R, G]=[0.9, 1, 1, 1.1]. The algorithm to determine which parameters to adjust based upon contribution plot values and how to adjust the weightings for those parameters may be varied by different implementation (e.g., always add or subtract 0.1, multiply by 1.1 or 0.9, always modify the top two parameters, always modify the weightings for any parameters with a value greater that 1.5, etc.). The above examples were provided for exemplary illustrative purposes, other parameters may be weighted and/or adjusted differently and still remain within the scope and spirit of the present invention.

The system 300 alternatively, or in conjunction to the step described in block 810, may receive an external input relating to the causes or non-causes of the faults (block 820). In other words, the system 300 may receive an indication from an external source, which could be an external computer, a controller, or a manual input from an operator, indicating whether the detected fault is an actual fault and/or whether any parameters associated with the fault or abnormality provides significant contribution to the fault or abnormality. Based upon this data, the system 300 then determines whether to increase, decrease, or leave unchanged the weighting relating to the factors or parameters relating to the faults (block 830).

If the system 300 determines, or is informed, that a particular parameter did indeed provide a significant contribution to the detected fault, then weighting of that particular parameter (e.g., the pressure data) may be increased to make the system 300 more sensitive to any variations in that parameter. Similarly, if the system 300 indicates that no significant contribution to the fault was provided by a particular parameter, the weighting of that parameter to the fault detection or PCA may be reduced. In other cases, the system 300 may determine that the weighting of a particular parameter remain unchanged. Therefore, the weighting of any parameter associated with the processing of semiconductor wafers 105, including the parameters illustrated in the exemplary matrix provided in FIG. 4, may be modified.

Based upon the determination whether to increase, decrease, or leave unchanged the weighting of the factors relating to the faults, the system 300 may dynamically add weight to the factors that caused the fault (block 840), reduce the weight to the factors that caused the fault (block 850), or leave the weighting of the factors unchanged (block 860). Based upon the dynamic adjustment of the weighting, the new weighted factors/parameters are provided for performing additional fault detection and/or PCA (block 870). Therefore, the weighting of the parameters may be dynamically adjusted on a continuous basis based upon various operations and resulting fault detection analysis and/or PCA performed on the data relating to the processing of semiconductor wafers 105. The newly weighted factors may cause a reduction of false fault indications and increase the sensitivity of parameters that may actually cause significant faults or abnormalities. Hence, a more accurate assessment of the condition of the processing tools 310 performing the processes on the semiconductor wafers 105 may be performed, resulting in a more efficient operation of processing tools 310 and reduced down times in the manufacturing areas. Therefore, utilizing embodiments of the present invention, a more effective and accurate process adjustment may be performed to achieve more accurate semiconductor wafer 105 characteristics and improved yields.

The principals taught by the present invention can be implemented in an Advanced Process Control (APC) Framework, such as a CATALYST™ system formerly offered by KLA Tencor, Inc. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principals taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   performing in a computer a fault detection analysis relating to processing of a workpiece;
   determining in a said computer a relationship of a parameter relating to said fault detection analysis to a detected fault;
   adjusting in said computer a weighting of said parameter based upon said relationship of said parameter to said detected fault; and
   performing in said computer the fault detection analysis relating to processing of a subsequent workpiece using said adjusted weighting.

2. The method of claim 1, wherein said workpiece comprises a semiconductor wafer.

3. The method of claim 1, wherein determining in said computer a relationship of a parameter relating to said fault detection analysis to a detected fault further comprises determining in said computer a causation of a parameter relating to said fault detection analysis to a detected fault.

4. The method of claim 1, wherein determining a relationship of a parameter relating to said fault detection analysis to a detected fault further comprises determining in said computer an importance of a parameter relating to said fault detection analysis to a detected fault.

5. The method of claim 1, further comprising:
   designated in said computer whether said detected fault is a significant fault; and
   adjusting said weighting associated with said parameter based responsive to designating said detected fault as a significant fault.

6. The method of claim 1, wherein performing in said computer said fault detection analysis further comprises utilizing a fault detection model to perform said fault detection, wherein said parameter is an input parameter to said fault detection model.

7. The method of claim 1, wherein determining in said computer said relationship of a parameter relating to said fault detection analysis to a detected fault further comprises determining in said computer whether said parameter is a significant factor associated with said fault.

8. The method of claim 1, wherein adjusting in said computer said weighting associated with said parameter based upon said relationship of said parameter to said detected fault further comprises decreasing in said computer said weighting associated with said parameter based upon said relationship.

9. The method of claim 1, wherein determining in said computer said relationship of a parameter relating to said fault detection analysis to said detected fault further comprises determining in said computer a relationship between at least one of pressure data, temperature data, humidity data, or gas flow rate data associated with said processing of said workpiece, to said detected fault.

10. The method of claim 1, further comprising:
    receiving in said computer metrology data relating to processing said workpiece;
    receiving in said computer tool state data relating to processing said workpiece; and
    correlating in said computer said metrology data and said tool state data with said fault data to characterize a fault.

11. The method of claim 10, wherein said tool state data further comprises at least one of pressure data, temperature data, humidity data, or gas flow rate data associated with said processing of said workpiece.

12. The method of claim 1, wherein performing in said computer said fault detection analysis further comprises performing a principal component analysis (PCA) relating to said processing of said workpiece.

13. The method of claim 12, wherein performing in said computer said principal component analysis further comprises utilizing a PCA model in said computer to perform said PCA, wherein said parameter is an input parameter to said PCA model.

14. The method of claim 1, wherein adjusting in said computer said weighting associated with said parameter based upon said relationship of said parameter to said detected fault further comprises increasing in said computer said weighting associated with said parameter based upon said relationship.

15. The method of claim 14, wherein increasing in said computer said weighting associated with said parameter based upon said relationship further comprises requiring in said computer a smaller fluctuation of said parameter during said fault detection analysis to determine that a fault associated with said processing of said workpiece has occurred.

16. The method of claim 15, wherein increasing in said computer said weighting associated with said parameter based upon said relationship further comprises requiring in said computer a larger fluctuation of said parameter during said fault detection analysis to determine that a fault associated with said processing of said workpiece has occurred.

17. An apparatus, comprising:
    means for performing a fault detection analysis in a computer relating to processing of a workpiece;
    means for determining in said computer a relationship of a parameter relating to said fault detection analysis to a detected fault;
    means for adjusting in said computer a weighting of said parameter based upon said relationship of said parameter to said detected fault; and
    means for performing in said computer the fault detection analysis relating to processing of a subsequent workpeice using adjusted weighting.

18. A non-transitory computer readable program storage device encoded with instructions that, when executed by a computer, performs a method, comprising:
    performing a fault detection analysis relating to processing of a workpeice;

determining a relationship of a parameter relating to said fault detection analysis to a detected fault;

adjusting a weighting of said parameter based upon said relationship of said parameter to said detected fault; and performing the fault detection analysis relating to processing of a subsequent workpeice using said adjusting weighting.

19. The non-transitory a computer readable program storage device encoded with instructions that, when executed by a computer, performs the method of claim 18, wherein performing said fault detection analysis further comprises utilizing a fault detection model to perform said fault detection, wherein said parameter is an input parameter to said fault detection model.

20. The non-transitory computer readable program storage device encoded with instructions that, when executed by a computer, performs the method of claim 18, wherein determining said relationship of a parameter relating to said fault detection analysis to a detected fault further comprises determining whether said parameter is a significant factor associated with said fault.

21. The non-transitory computer readable program storage device encoded with instructions that, when executed by a computer, performs the method of claim 18, wherein determining said relationship of a parameter relating to said fault detection analysis to said detected fault further comprises determining a relationship between at least one of pressure data, temperature data, humidity data, or gas flow rate data associated with said processing of said workpiece, to said detected fault.

22. The non-transitory computer readable program storage device encoded with instructions that, when executed by a computer, performs the method of claim 18, wherein performing said fault detection analysis further comprises performing a principal component analysis (PCA) relating to said processing of said workpiece.

23. The non-transitory computer readable program storage device encoded with instructions that, when executed by a computer, performs the method of claim 22, wherein performing said principal component analysis further comprises utilizing a PCA model to perform said PCA, wherein said parameter is an input parameter to said PCA model.

24. The non-transitory computer readable program storage device encoded with instructions that, when executed by a computer, performs the method of claim 18, wherein adjusting said weighting associated with said parameter based upon said relationship of said parameter to said detected fault further comprises increasing said weighting associated with said parameter based upon said relationship.

25. The non-transitory computer readable program storage device encoded with instructions that, when executed by a computer, performs the method of claim 24, wherein increasing said weighting associated with said parameter based upon said relationship further comprises requiring a smaller fluctuation of said parameter during said fault detection analysis to determine that a fault associated with said processing of said workpiece has occurred.

26. The non-transitory computer readable program storage device encoded with instructions that, when executed by a computer, performs the method of claim 18, wherein adjusting said weighting associated with said parameter based upon said relationship of said parameter to said detected fault further comprises decreasing said weighting associated with said parameter based upon said relationship.

27. The non-transitory computer readable program storage device encoded with instructions that, when executed by a computer, performs the method of claim 26, wherein increasing said weighting associated with said parameter based upon said relationship further comprises requiring a larger fluctuation of said parameter during said fault detection analysis to determine that a fault associated with said processing of said workpiece has occurred.

28. The non-transitory computer readable program storage device encoded with instructions that, when executed by a computer, performs the method of claim 18, further comprising:

acquiring metrology data relating to processing said workpiece;

acquiring tool state data relating to processing said workpiece; and correlating said metrology data and said tool state data with said fault data to characterize a fault.

29. The non-transitocv computer readable program storage device encoded with instructions that, when executed by a computer, performs the method of claim 28, wherein acquiring said tool state data relating to processing said workpiece further comprises acquiring at least one of pressure data, temperature data, humidity data, or gas flow rate data associated with said processing of said workpiece.

30. The non-transitory computer readable program storage device encoded with instructions that, when executed by a computer, performs the method of claim 28, further comprising determining a relationship of a parameter relating to said fault detection analysis to a detected fault further comprises determining a causation of a parameter relating to said fault detection analysis to a detected fault.

31. The non-transitory computer readable program storage device encoded with instructions that, when executed by a computer, performs the method of claim 28, further comprising determining a relationship of a parameter relating to said fault detection analysis to a detected fault further comprises determining an importance of a parameter relating to said fault detection analysis to a detected fault.

* * * * *